United States Patent
Duranleau-Hendrickx

(10) Patent No.: US 12,129,804 B1
(45) Date of Patent: Oct. 29, 2024

(54) SHIFTED BLEED VALVE MODULATION DETECTION

(71) Applicant: Pratt & Whitney Canada Corp., Longueuil (CA)

(72) Inventor: Louis Duranleau-Hendrickx, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/459,668

(22) Filed: Sep. 1, 2023

(51) Int. Cl.
*F02C 9/18* (2006.01)

(52) U.S. Cl.
CPC .......... *F02C 9/18* (2013.01); *F05D 2220/323* (2013.01); *F05D 2260/606* (2013.01); *F05D 2270/02* (2013.01); *F05D 2270/05* (2013.01)

(58) Field of Classification Search
CPC ...... F02C 9/18; F02C 6/08; F02C 3/06; F05D 2240/58; F05D 2270/101; F05D 2270/102
See application file for complete search history.

(56) References Cited

U.S. PATENT DOCUMENTS

| | | | |
|---|---|---|---|
| 3,606,971 A * | 9/1971 | Harrison | F25C 3/04 239/14.1 |
| 6,141,951 A | 11/2000 | Krukoski et al. | |
| 6,506,010 B1 * | 1/2003 | Yeung | F04D 27/02 416/42 |
| 7,025,088 B2 | 4/2006 | Saunders | |
| 7,843,354 B2 | 11/2010 | Holt et al. | |
| 9,068,463 B2 | 6/2015 | Pandey et al. | |
| 9,546,604 B2 | 1/2017 | Clauson et al. | |
| 10,837,311 B2 | 11/2020 | Scothern | |
| 11,346,288 B2 * | 5/2022 | Schwarz | G01M 15/09 |
| 11,359,550 B2 * | 6/2022 | Ota | F04D 27/0292 |
| 11,454,176 B2 | 9/2022 | Duranleau-Hendrickx | |
| 2019/0264701 A1 * | 8/2019 | Rowe | F04D 27/02 |
| 2021/0270190 A1 * | 9/2021 | Duranleau-Hendrickx | G01M 15/14 |

* cited by examiner

*Primary Examiner* — Thuyhang N Nguyen
(74) *Attorney, Agent, or Firm* — CANTOR COLBURN LLP

(57) ABSTRACT

An aircraft engine includes a compressor section including an engine compressor and a bleed off valve (BOV) fluidically coupled to the compressor section. A controller is configured to determine at least one real-time compressor delivery pressure in the compressor section and to determine whether at least one fault is present in the aircraft engine based on a comparison between the at least one real-time compressor delivery pressure and at least one predetermined nominal compressor delivery pressure resulting from a non-faulty BOV valve and a non-faulty compressor.

14 Claims, 8 Drawing Sheets

SHIFTED BLEED VALVE MODULATION DETECTION

BACKGROUND

The subject matter disclosed herein generally relates to aircraft gas turbine engines and, more particularly, to a gas turbine pneumatic bleed valve.

A variety of gas turbine engines are fitted with one or more bleed valves, sometimes referred to as bleed off valves (BOVs). The BOV is used to bleed compressed air at an intermediate compressor station (e.g., P2.X) during low power and/or partial power operation. In order to prevent compressor instability in the upstream air flow stages (e.g., stall or surge) after the bleed, the BOV is intended to shift to a closed position at targeted power ratings or targeted engine core speeds.

In some engine designs, the BOV can be electronically controlled with a direct position feedback, while other engine designs use pneumatic pressure balances to modulate (e.g., operate) the BOV between a closed position and an open position. For some pneumatic BOVs, there is no direct feedback about the BOV position (e.g., from a position sensor). As a result, it may be difficult to detect a BOV having a shifted modulation, i.e., a BOV that has shifted from its intended position due to an internal failure or leakage).

SUMMARY

According to a non-limiting embodiment an aircraft engine includes a compressor section including an engine compressor and a bleed off valve (BOV) fluidically coupled to the compressor section. A controller is configured to determine at least one real-time compressor delivery pressure (P3) in the compressor section and to determine whether at least one fault is present in the aircraft engine based on a comparison between the at least one real-time compressor delivery pressure and at least one predetermined nominal compressor delivery pressure resulting from a non-faulty BOV valve and a non-faulty compressor.

In addition to one or more of the features described herein, or as an alternative, the at least one fault includes one or both of a first fault present in the BOV and a second fault present compressor section.

In addition to one or more of the features described herein, or as an alternative, the at least one real-time compressor delivery pressure includes a first real-time compressor delivery pressure and a second real-time compressor delivery pressure that is greater than the first real-time compressor delivery pressure, the at least one predetermined nominal compressor delivery pressure includes a first predetermined nominal compressor delivery pressure and a second predetermined nominal compressor delivery pressure that is greater than the first predetermined nominal compressor delivery pressure.

In addition to one or more of the features described herein, or as an alternative, the first real-time compressor delivery pressure (P3CLP) is determined when the engine compressor is operating at one or both of a low power and low speed and the second real-time compressor delivery pressure (P3CHP) is determined when the engine compressor is operating at one or both of a high power greater than the low power and a high speed greater than the low speed, and the first predetermined nominal compressor delivery pressure (P3LP) is determined when the engine compressor is operating at one or both of the low power and the low speed and a second predetermined nominal compressor delivery pressure (P3HP) is determined when the engine compressor is operating at one or both of the high power greater the high speed.

In addition to one or more of the features described herein, or as an alternative, the controller determines a presence of the first fault in the BOV in response to the second real-time compressor delivery pressure (P3CHP) being lower than the second predetermined nominal compressor delivery pressure (P3HP) and the first real-time compressor delivery pressure (P3CLP) being equal or greater than the first predetermined nominal compressor delivery pressure (P3LP).

In addition to one or more of the features described herein, or as an alternative, the controller determines a presence of the second fault in the compressor section in response to the first real-time compressor delivery pressure (P3CLP) being lower than the first predetermined nominal compressor delivery pressure (P3LP) and the second real-time compressor delivery pressure (P3CHP) being lower than the second predetermined nominal compressor delivery pressure (P3HP).

In addition to one or more of the features described herein, or as an alternative, the controller determines the first fault and the second fault are not present in response to the first real-time compressor delivery pressure (P3CLP) being equal or greater than the first predetermined nominal compressor delivery pressure (P3LP) and the second real-time compressor delivery pressure being equal (P3CHP) or greater than the second predetermined nominal compressor delivery pressure (P3HP).

In addition to one or more of the features described herein, or as an alternative, the controller determines a false fault detection in response to the first real-time compressor delivery pressure (P3CLP) being lower than the first predetermined nominal compressor delivery pressure (P3LP) and the second real-time compressor delivery pressure (P3CHP) being equal or greater than the second predetermined nominal compressor delivery pressure (P3HP).

In addition to one or more of the features described herein, or as an alternative, the controller determines a presence of the at least one fault in response to comparing a first ratio, between the second real-time compressor delivery pressure (P3CHP) and the first real-time compressor delivery pressure (P3CLP), and a second ratio, between the second predetermined nominal compressor delivery pressure (P3HP) and the first predetermined nominal compressor delivery pressure (P3LP).

In addition to one or more of the features described herein, or as an alternative, the controller determines the presence of the at least one fault in response to the first ratio being less than the second ratio.

According to another non-limiting embodiment, a method of diagnosing an aircraft engine is provided. The method comprises fluidically coupled a bleed off valve (BOV) to a compressor section of the aircraft engine, and determining, using a controller, at least one real-time compressor delivery pressure (P3) in the compressor section. The method further comprises comparing by the controller the at least one real-time compressor delivery pressure and at least one predetermined nominal compressor delivery pressure resulting from a non-faulty BOV valve and a non-faulty compressor; and determining whether at least one fault is present in the aircraft engine based on the comparison.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
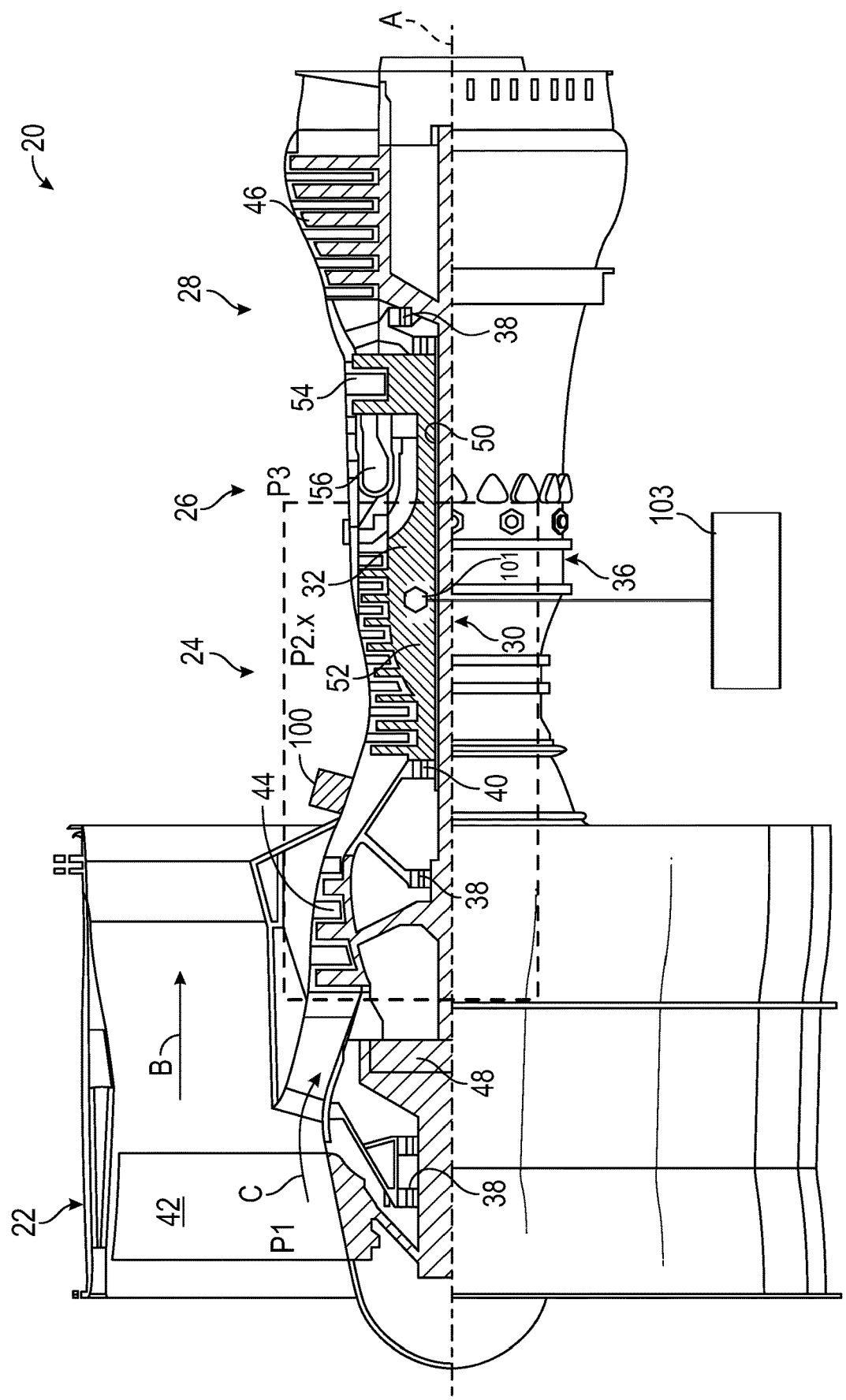
FIG. 1 is a schematic illustration of an aircraft gas turbine engine in accordance with a non-limiting embodiment of the present disclosure.

BOVs are used to prevent engine compressor surge/stall at low power/speed such as 0% to about 30% power/speed, for example, by bleeding compressed air out of the gas path. At higher power/speed such as about 70% to 100%, for example, the risk of compressor instability is reduced by a closer matching of the compressor stages flow characteristics and the BOV is normally closed when the engine core operates at a target engine core speed. However, a shift into the closed position at a speed later than the intended target speed (e.g., a delayed closed position shift or modulation) can cause a reduction in available engine power, thrust and/or performance margins at takeoff. Therefore, there is a need to detect a faulty modulation (e.g., a delayed closed position shift or modulation) that may occur in BOV valves where there is no direct feedback about the BOV position (i.e., when there is no valve position sensor to measure an open or closed position of the BOV).

Various non-limiting embodiments of the present disclosure provide an aircraft diagnostic system capable of detecting one of faulty BOV valve and a faulty compressor based on the operation (e.g., modulation) of a BOV valve. In one or more non-limiting embodiments, the system operates as a BOV faulty modulation detection system capable of detecting a faulty modulation of a BOV valve where there is no direct feedback about the BOV position (e.g., from a position sensor). According to a non-limiting embodiment, the BOV faulty modulation detection system obtains nominal or expected compressor delivery pressure values (P3) resulting from the nominal modulation of a healthy BOV across a range of low power/low speed values (e.g., idle speed) to high power/high speed values (e.g., take off). The BOV faulty modulation detection system then compares real-time compressor delivery pressure values (P3) across the same range of low power/low speed values and high power/high speed values. A difference between the nominal or expected compressor delivery pressure values and the real-time nominal or expected compressor delivery pressure values indicates the presence of a fault in either the BOV or the engine compressor core.

In one or more non-limiting embodiments of the invention, a faulty BOV modulation shift can be differentiated from a non-faulty BOV operating while the compressor is experiencing a general air leak/blockage. For example, a difference between the nominal pressure at high power (P3HP) and the real-time P3HP combined with a real-time pressure at low power (P3LP) aligned with the nominal P3LP indicates a faulty BOV modulation shift. A difference between both the nominal pressure at high power (P3HP) and pressure at lower power (P3LP) with respect to the real time P3HP and P3LP indicates that the BOV is operating properly, but a general air leak/blockage exists in the compressor. This is because a general air leak/blockage of compressed air will impact the engine P3 across the entire power range, but a shifted BOV modulation will only have an impact after the start of the nominal BOV modulation (i.e., because before that the BOV is nominally fully opened regardless).

Turning now to FIG. 1, a gas turbine engine 20 is schematically depicted according to a non-limiting embodiment of the present disclosure. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines, including three-spool architectures.

The exemplary engine 20 generally includes a low-speed spool 30 and a high-speed spool 32 mounted for rotation about an engine central longitudinal axis A relative to an engine static structure 36 via several bearing systems 38. In some embodiments, various bearing systems 38 at various locations may alternatively or additionally be provided, and the location of bearing systems 38 may be varied as appropriate to the application.

The low-speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a high pressure compressor 52 and high pressure turbine 54. A combustor 56 is arranged in exemplary gas turbine engine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high pressure turbine 54 and low pressure turbine 46. In some embodiments, stator vanes 45 in the low-pressure compressor 44 and stator vanes 55 in the high-pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

With continued reference to FIG. 1, the gas turbine engine 20 further includes a bleed off valve (BOV) 100 fluidically coupled to the compressor section 24. In one or more non-limiting embodiments the BOV 100 is disposed between the low-pressure compressor 44 and the high-pressure compressor 52. As described herein, the BOV is utilized to prevent engine compressor surge/stall at low power/low speed by bleeding compressed air out of the gas path. For example, the BOV 100 can be disposed at an intermediate compressor station (P2.X) 102 located between the low pressure station (P1) and the high pressure station (P3). In a non-limiting embodiment, the BOV 100 is disposed at the inlet (P2.5) of the high pressure station (P3). The term "P1" is sometimes referred to as the "inlet compressor pressure, the term "P2.5" is sometimes referred to as the "interstage pressure", and the term "P3" is sometimes referred to as the "compressor discharge pressure." The values of P1, P2.5 and/or P3 can be directly measured by a sensor 101 and/or can be calculated (typically referred to as "synthesized") by an electronic controller 103 such as an engine controller of FADEC. Accordingly, the controller 103 can utilize P3 to establish a BOV faulty modulation detection system capable of detecting a faulty modulation of the BOV valve 100 when there is no direct feedback about the BOV position (e.g., from a position sensor). In at least one non-limiting embodiment, a sensor 101 is in signal communication with a controller 103. The sensor 101 is disposed in the high pressure air path and outputs a measured P3 value to the controller 103.

The engine 20 in one example is a high-bypass geared aircraft engine. It should be understood, however, that the above parameters are only exemplary of one embodiment of a geared architecture engine and that the present disclosure is applicable to other gas turbine engines including direct drive turbofans.

While FIG. 1 illustrates one example of the gas turbine engine 20, in alternate embodiments any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
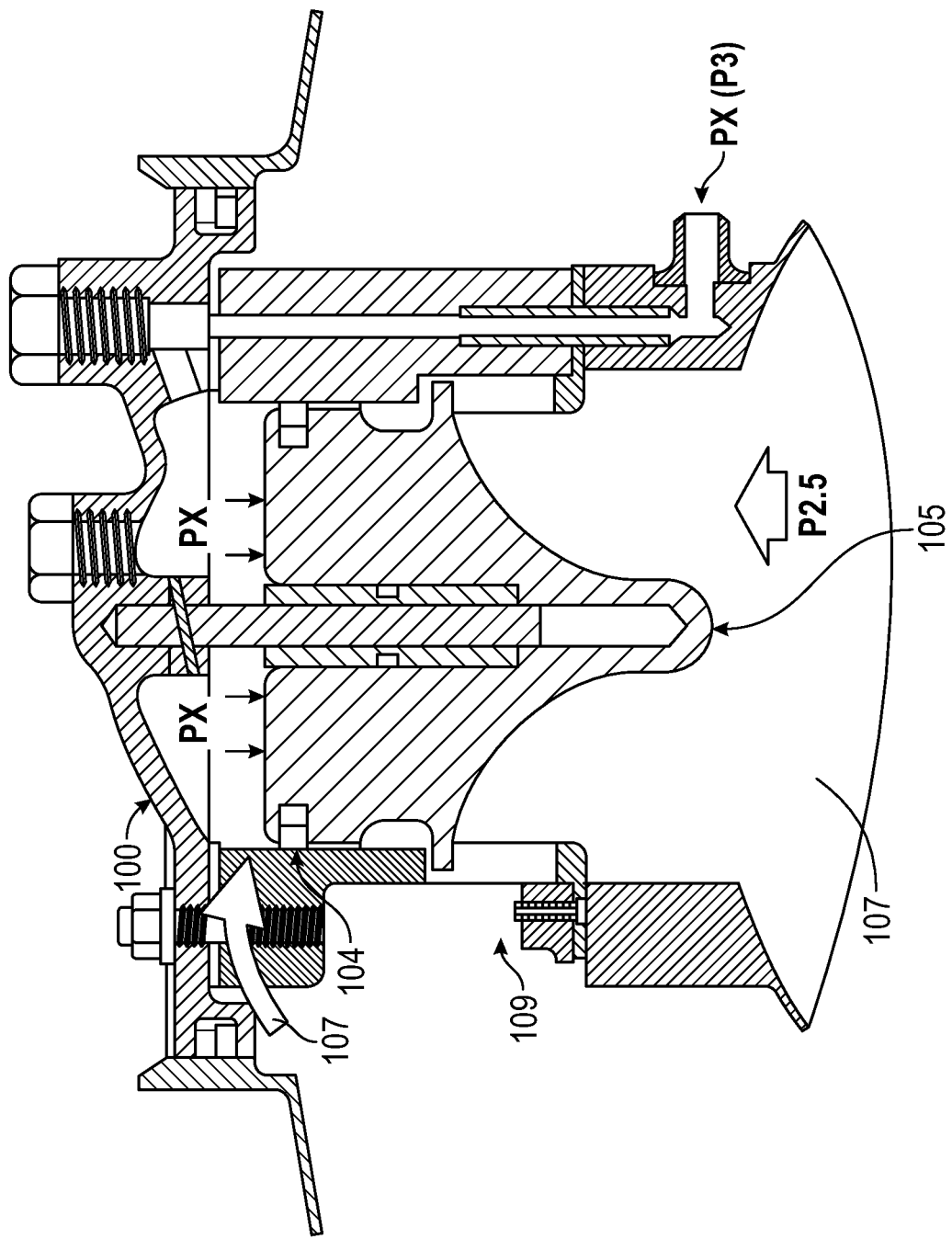
FIG. 2 illustrates a BOV in a nominally opened position according to a non-limiting embodiment of the present disclosure.
Figure 3:
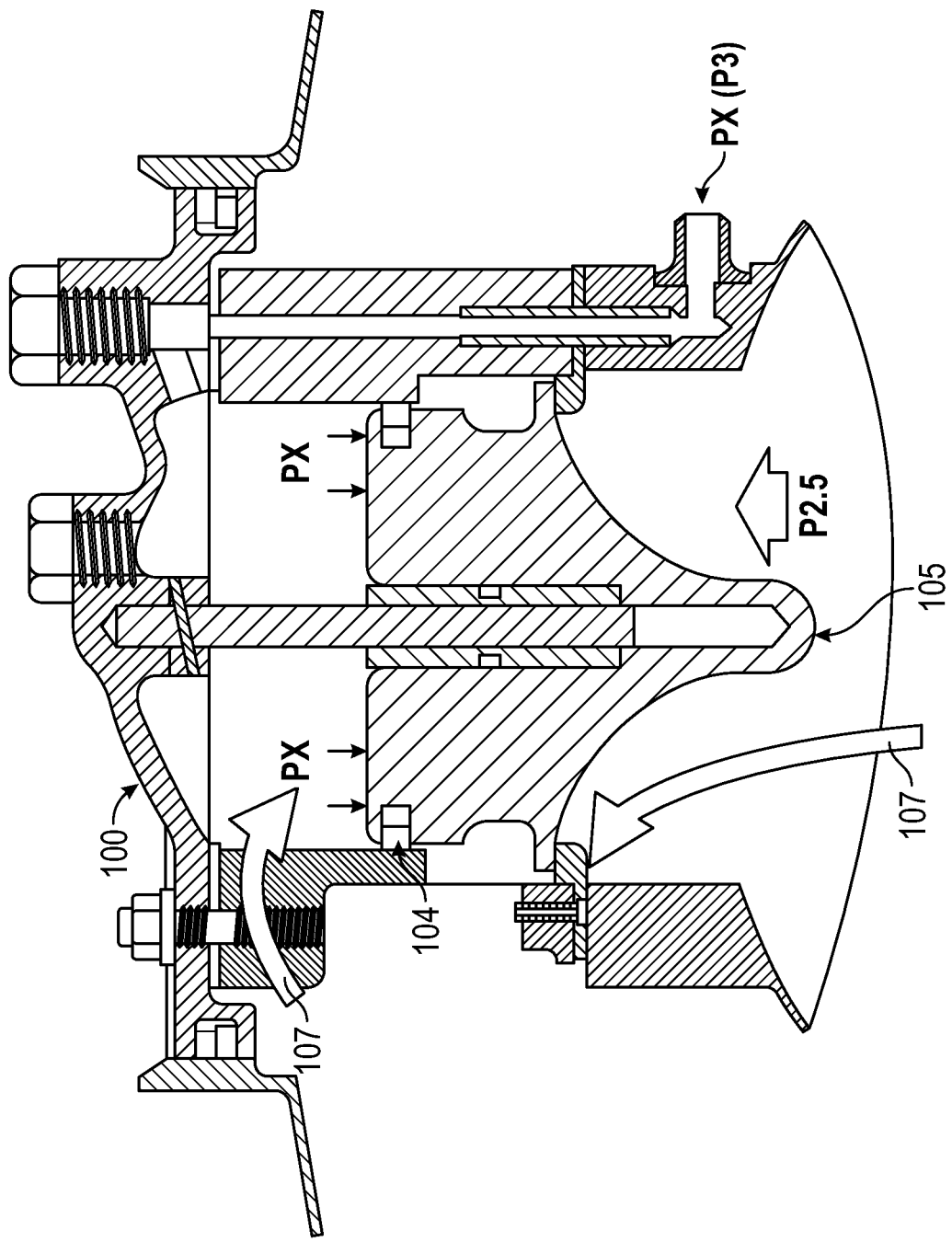
FIG. 3 illustrates the BOV of FIG. 2 in a nominally closed position according to a non-limiting embodiment of the present disclosure.
Figure 4:
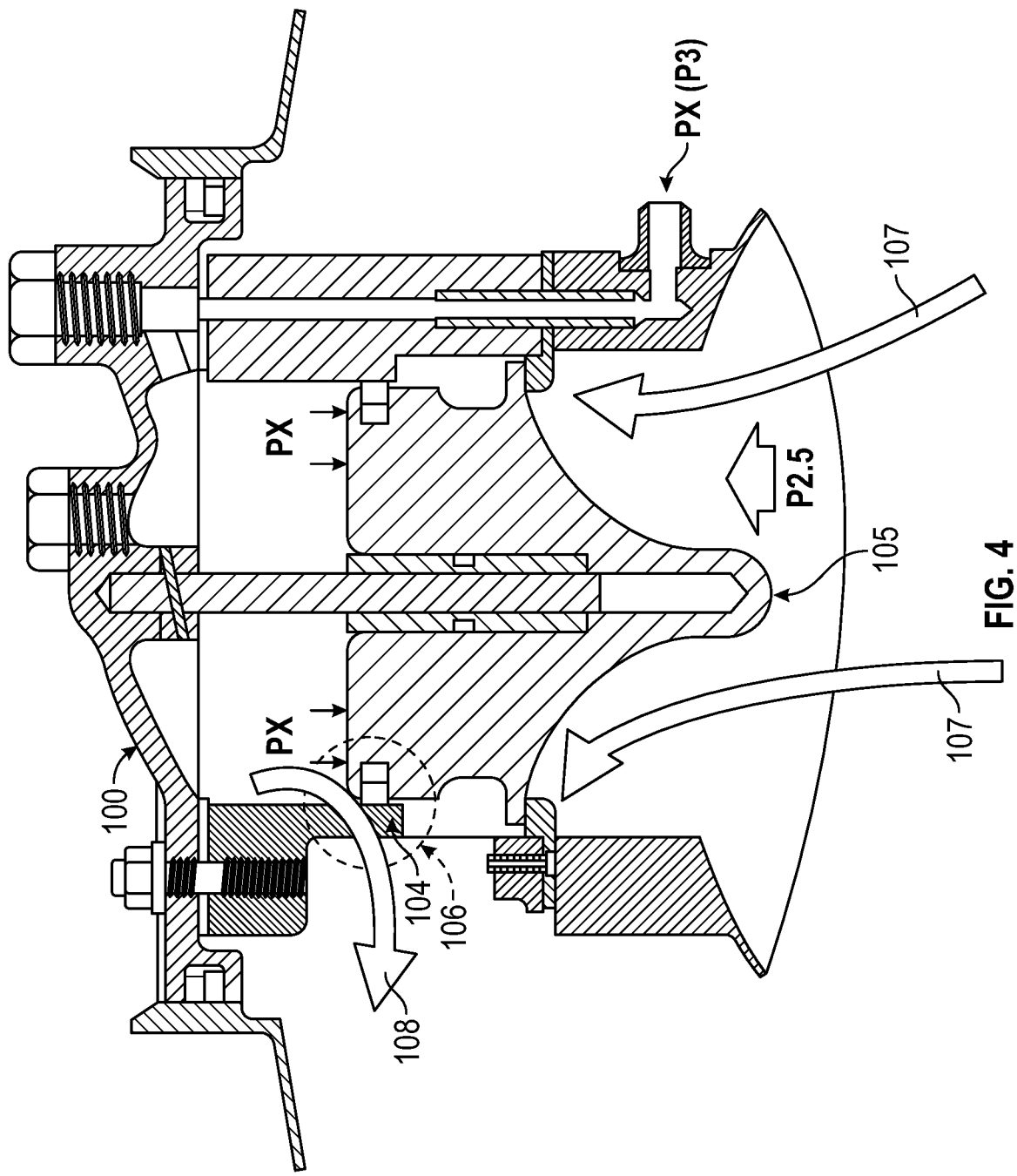
FIG. 4 illustrates the BOV of FIG. 2 experiencing air leakage while in the closed position according to a non-limiting embodiment of the present disclosure.

Turning to FIGS. 2, 3 and 4, a BOV 100 is illustrated according to a non-limiting embodiment of the disclosure. The BOV 100 includes a piston 105 that moves upward and downward to established open and closed positions, respectively. When PX is less than P2.5, the piston 105 is forced upward into the open position as shown in FIG. 2. Accordingly, air 107 flowing through the valve 100 can be exhausted from the valve outlet 109. The piston O-ring 104, however, prevents air at the PX side from entering into the valve 100 and prevents air 107 from flowing through the valve outlet 109. Therefore, the pressure differential of PX<P2.5 can be maintained.

When PX is greater than P2.5, the piston 105 is forced downward into the nominal closed position and seals the valve outlet 109 as shown in FIG. 3. Accordingly, air 107 at both the PX side and the P2.5 side is prevented from exiting the valve 101 such that the pressure differential PX >2.5 can be maintained. FIG. 2 illustrates a BOV 100 in a nominal modulated open position, which is typical during low power/low speed conditions such as, for example, idle conditions. When in the closed position, the piston 105 is displaced downward and seals air 107 from flowing into the BOV 100.

Referring to FIG. 4, the BOV 100 is illustrated in the closed position while experiencing a fault. In the example shown in FIG. 4, the fault is an air leakage fault caused by a faulty piston ring 104. For instance, the piston ring 104 can incur a crack which allows leakage air 108 to escape the BOV 100 and reduce PX causing a change in the PX<P2.5 differential. As a result, P3 at high core speeds (P3HP) will fall below the nominal or expected P3HP.

Figure 5:
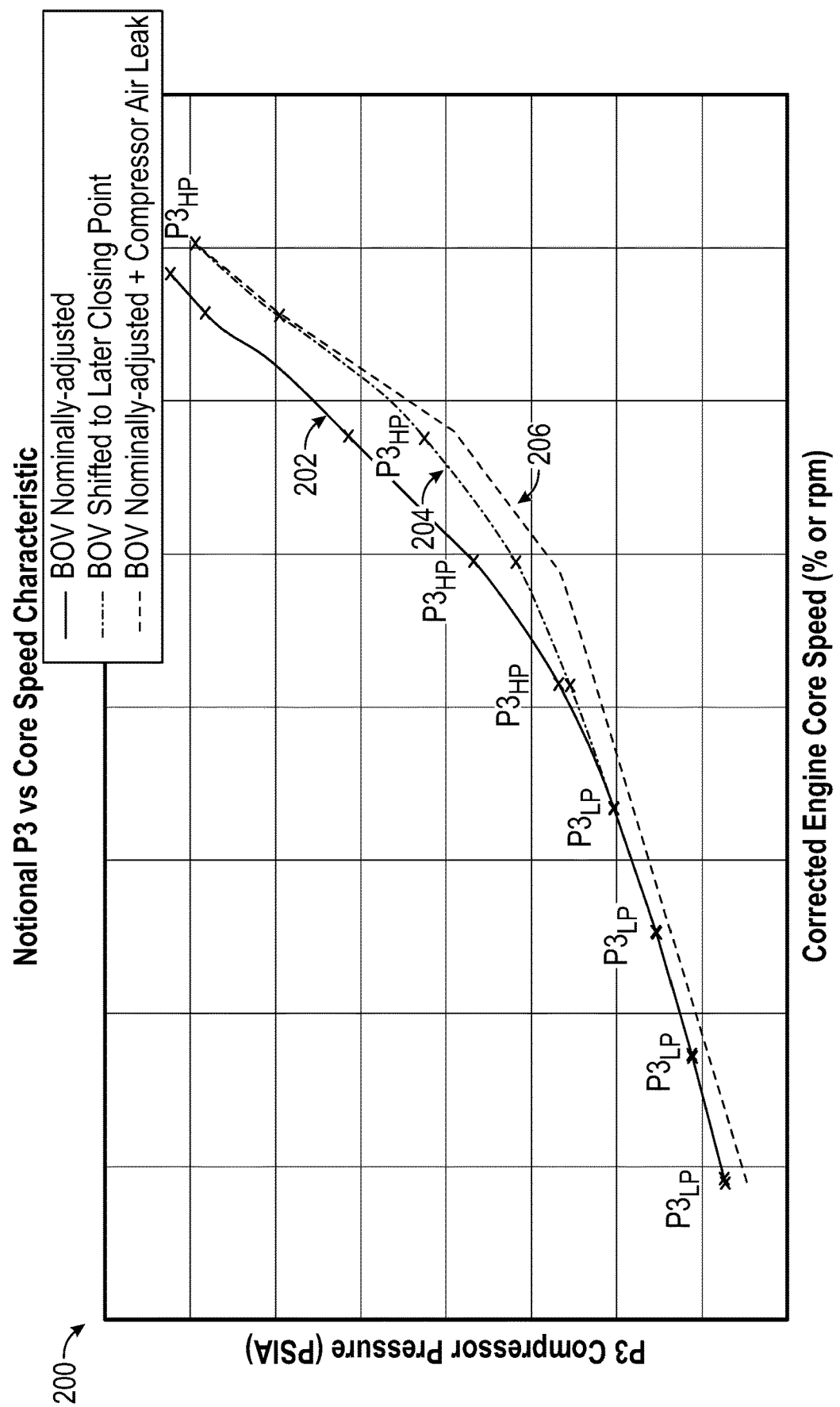
FIG. 5 is a graph depicting compressor delivery pressure (P3) versus engine core speeds measured when a BOV is operating in a nominal condition compared to when a BOV is operating during different fault conditions according to a non-limiting embodiment of the present disclosure.

FIG. 5 is a graph depicting compressor delivery pressure values (P3) pressure measurements versus engine core speeds (rpm or % power) during different BOV and engine nominal operating and failure states according to a non-limiting embodiment of the present disclosure. When a non-faulty BOV 100 modulates to its closed position at a respected target engine core speed as expected, a plurality of compressor delivery pressure values measured from a minimum low power/low speed "P3LP" (e.g., idle) up to a maximum high power/high speed "P3HP" (e.g., take off) defines a first curve 202. The first curve 202 represents the nominal or expected operation of the BOV when no faults exist in the BOV and/or the compressor. In one or more non-limiting embodiments, the first curve 202 can be utilized as a nominal threshold boundary for the compressor P3 measured from a minimum low power/low speed "P3LP" (e.g., idle) up to a maximum high power/high speed "P3HP."

When a faulty BOV 100 modulates to its closed position at an engine core speed that is later than the expected target speed, a plurality of compressor delivery pressure values measured from a minimum low power/low speed "P3LP" to a maximum high power/high speed "P3HP" defines a second curve 204. In this scenario, the BOV 100 is experiencing a fault (e.g., an air leak in the valve ring) that shifts (i.e., delays) its closing point speed with respect to it nominal closing point speed. As a result, the real-time pressure (P3HP) on the second curve 204 at a given high power/high speed is lower than the expected pressure (P3HP) on the first curve 202 at the given high power/high speed.

When the BOV 100 is operating properly, but the engine compressor itself is experiencing an air leak and/or a blockage, a plurality of compressor delivery pressure values measured from a minimum low power/low speed "P3LP" to a maximum high power/high speed "P3HP" defines a third curve 206. This scenario occurs because a general air leak/blockage of compressed air will impact the compressor delivery pressure (P3) across the entire power/speed range. That is, the air leak and/or a blockage will reduce P3 at both low power/low speed (i.e., the P3LP) and high power/high speed (i.e., the P3HP), unlike a faulty BOV 100 experiencing a delayed closing modulation which will only have an impact P3 at high power/high speed (i.e., the P3HP) as it attempts to shift into the closed position.

Figure 6:
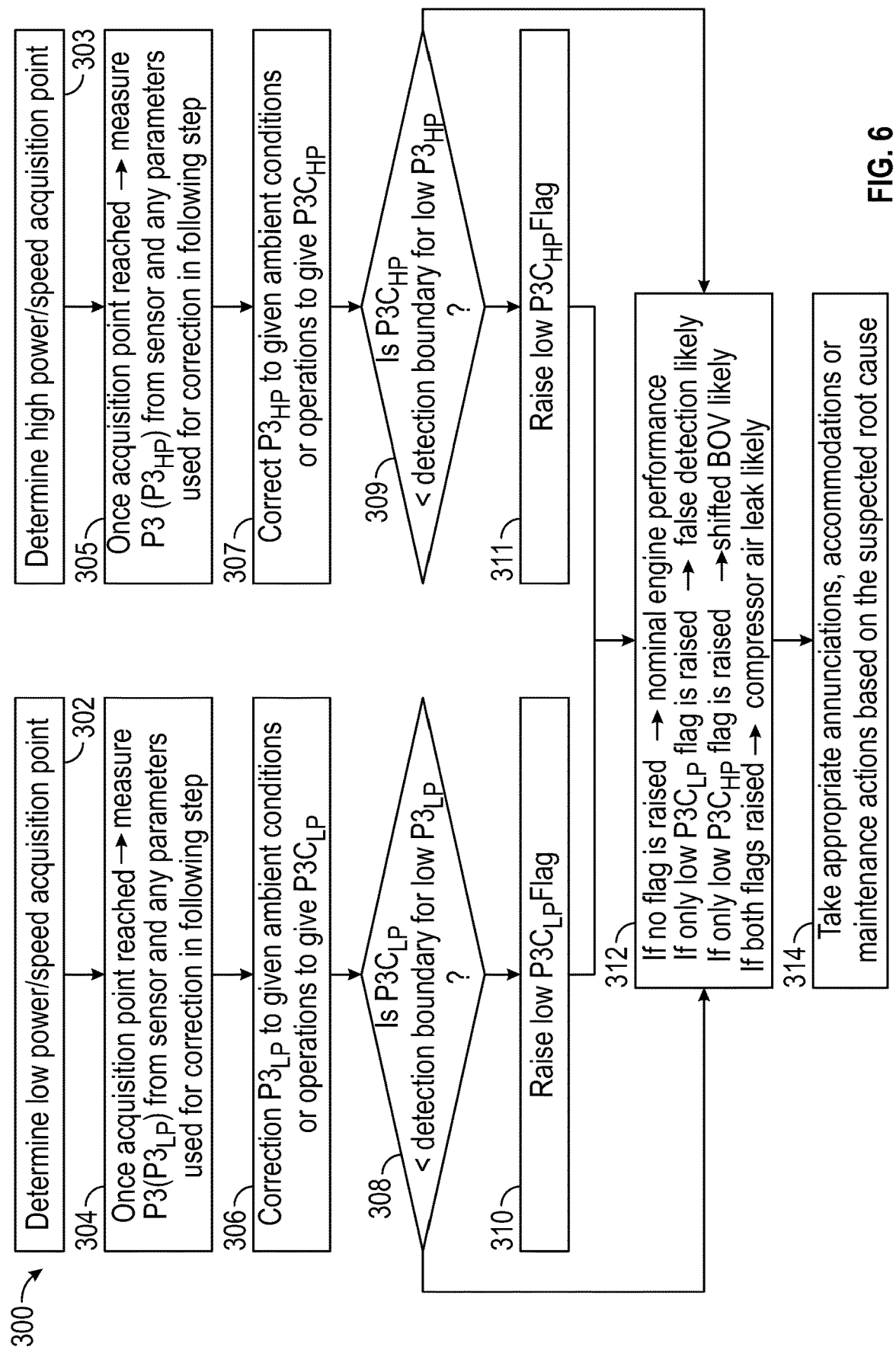
FIG. 6 is a flow diagram illustrating a method of diagnosing an aircraft engine according to a non-limiting embodiment of the present disclosure.

The differences between the expected P3 values produced by a non-faulty BOV 100 and the reduced P3 values caused by faulty BOV operation and/or a faulty compressor (e.g., compressor leakage/blockage) can be utilized to implement a fault diagnosis system. For example, the fault diagnosis system can server as a BOV faulty modulation detection system that detects a faulty modulation of a BOV valve 100 where there is no direct feedback about the BOV position. Turning to FIG. 6, a method 300 of diagnosing an aircraft engine 20 is illustrated according to a non-limiting embodiment of the present disclosure. At operation 302, a low power/low speed value (e.g., acquisition point) is determined and at operation 303 a high power/high speed value (e.g., acquisition point is determined. At operation 304, a real-time compressor delivery pressure value at the (P3LP) at the low power/low speed acquisition point is determined, along with one or more ambient conditions used for gas turbine parameters correction. The real-time P3LP can be obtained using, for example, a pressure sensor. Likewise, a real-time compressor delivery pressure value at the (P3HP) at the high power/high speed acquisition point is determined at operation 305. Additional ambient conditions used for gas turbine parameters correction can also be obtained if necessary. At operation 306, the real-time P3LP can be corrected or calibrated based on the ambient conditions to generate a corrected P3LP (i.e., P3CLP). Likewise, the real-time P3HP can be corrected or calibrated based on the ambient conditions to generate a corrected P3HP (i.e., P3CHP) at operation 307.

At operation 308, a comparison is performed between the P3CLP and an expected P3LP included in the nominal threshold boundary (e.g., first curve 202) at the low power/low speed acquisition point. Likewise at operation 309, a comparison is performed between the P3CHP and an expected P3HP included in the nominal threshold boundary (e.g., first curve 202) at the high power/high speed acquisition point When both the P3CLP and the P3CHP are not below the expected P3LP, nominal engine and BOV performance is determined at operation 312 and a nominal performance indicator can be generated at operation 314.

When, however, the P3CLP is below the expected P3LP, a low P3CLP flag is raised at operation 310. Likewise, when the P3CHP is below the expected P3HP, a low P3CHP flag is raised at operation 311. When only the P3CLP flag is raised (the P3CHP flag is not raised), a false fault detection is determined at operation 312 and an indicator of a false fault detection is generated at operation 314. Accordingly, the difference between the P3CLP and the expected P3LP is disregarded. When only the P3CHP flag is raised (the P3CLP flag is not raised), a shift in the expected BOV modulation is determined at operation 312. That is, it can be determined that a faulty operating BOV is realizing a shift or delay in its closing modulation. Accordingly, an alert indicating a faulty BOV is generated at operation 314. When both the P3CLP flag and the P3CHP flag are raised, fault associated with the compressor is determined at operation 312. For example, the engine compressor can be determined to be experiencing a general air leak and/or blockage and an alert indicating a faulty compressor is generated at operation 314.

Figure 7:
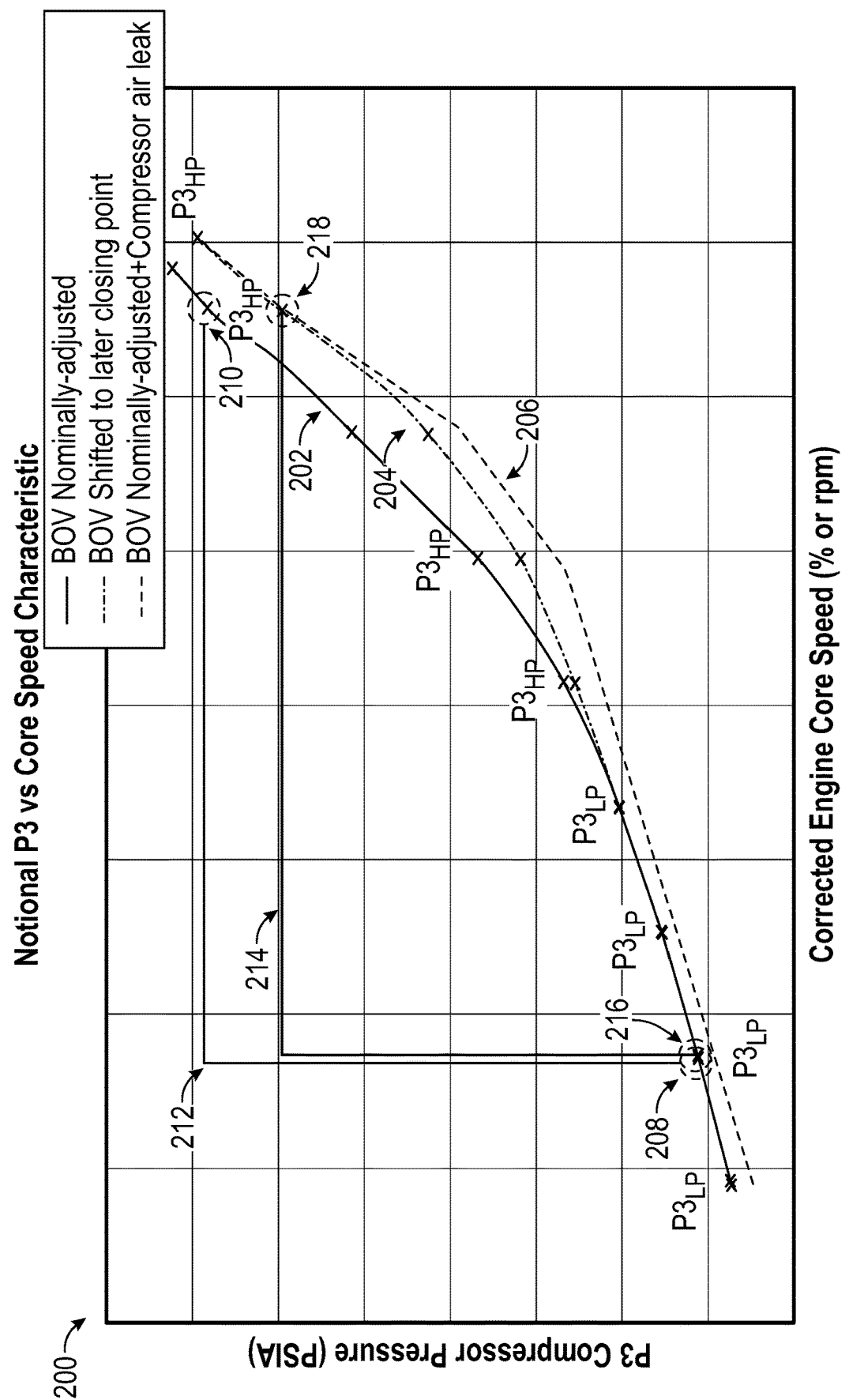
FIG. 7 is a graph depicting a ratio between P3 at a high core speed and P3 at a low core speed.

FIG. 7 is a graph depicting a ratio 212 between a first compressor delivery pressure value (P3LP) 208 measured at a low power/low speed and a second compressor delivery pressure value (P3HP) 210 measured at a high power/high speed when a BOV is operating without a fault, and a second ratio 214 between a first compressor delivery pressure value (P3LP) 216 measured at a low power/low speed and a second compressor delivery pressure value (P3HP) 218 measured at a high power/high speed when the compressor section of the gas turbine engine is experiencing a fault, i.e., a faulty BOV and/or an air leakage or blockage in the engine compressor itself. Although the ratio differential can indicate the presence of a fault in the compress section, it may not necessarily indicate the specific type of fault the exists, i.e., whether the fault is associated with the BOV or the engine compressor itself.

Figure 8:
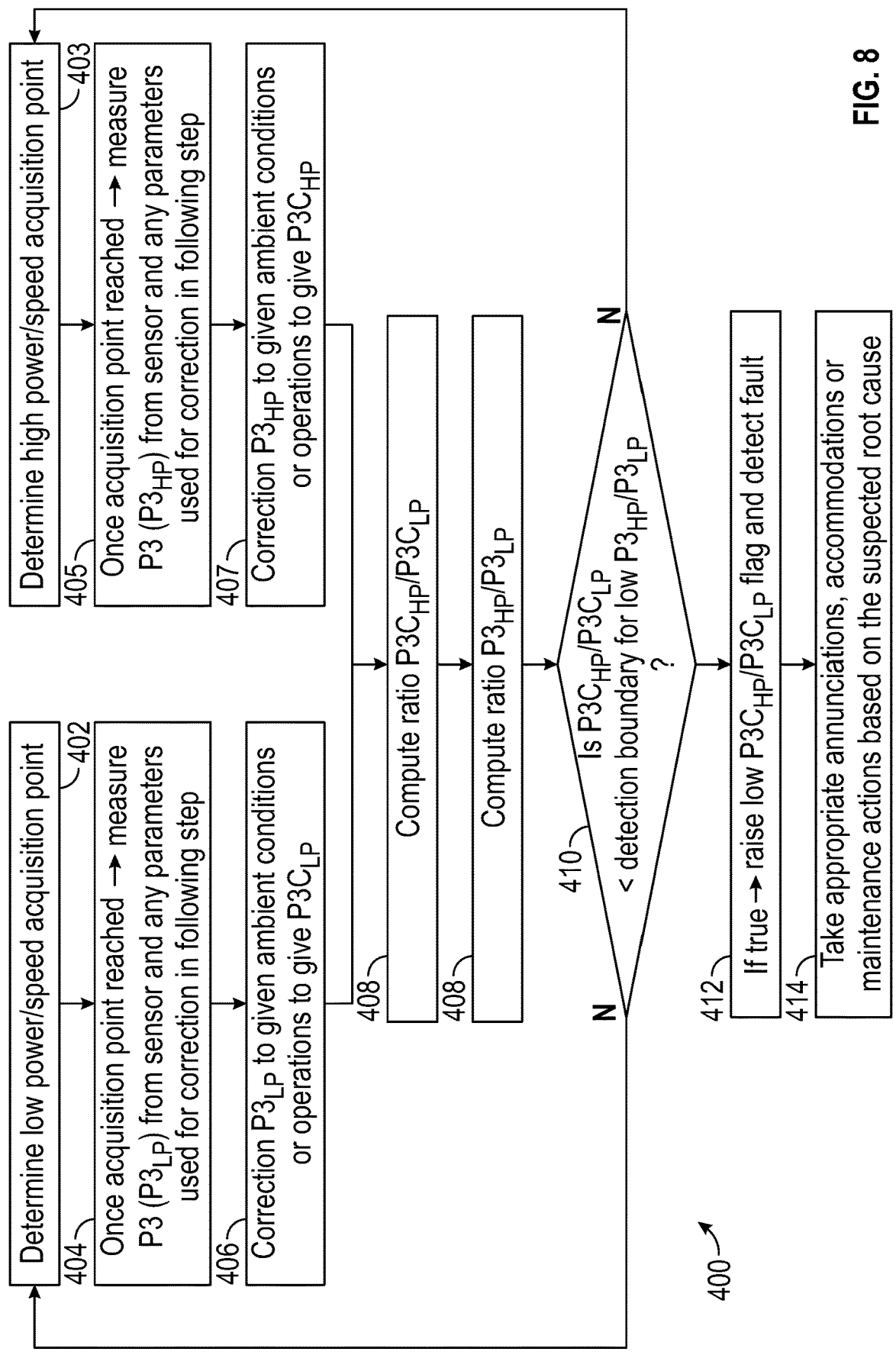
FIG. 8 is a flow diagram illustrating a method of diagnosing the operating condition of a BOV based on a ratio between P3 at a high core speed and P3 at a low core speed according to a non-limiting embodiment of the present disclosure.

Referring to FIG. 8, a method 400 of diagnosing an aircraft engine according to a non-limiting embodiment. The diagnosis includes, for example, whether a fault exists in a BOV and/or a compressor section of the aircraft engine. At operation 402, a low power/low speed value (e.g., acquisition point) is determined and at operation 403 a high power/high speed value (e.g., acquisition point is determined. At operation 404, a real-time compressor delivery pressure value at the (P3LP) at the low power/low speed acquisition point is determined, along with one or more ambient conditions used for gas turbine parameters correction. The real-time P3LP can be obtained using, for example, a pressure sensor. Likewise, a real-time compressor delivery pressure value at the (P3HP) at the high power/high speed acquisition point is determined at operation 305. Additional ambient conditions used for gas turbine parameters correction can also be obtained if necessary. At operation 406, the real-time P3LP can be corrected or calibrated based on the ambient conditions to generate a corrected P3LP (i.e., P3CLP). Likewise, the real-time P3HP can be corrected or calibrated based on the ambient conditions to generate a corrected P3HP (i.e., P3CHP) at operation 407.

At operation 408, a first ratio between the P3CHP and the P3CLP is determined, and at operation 410 a second ratio between an expected P3HP and P3LP located on a nominal boundary threshold (e.g., first curve 202) is determined. At operation 412, a comparison is performed between the first ratio (P3CHP/P3CLP) and the second ratio (P3HP/P3LP). When the first ratio (P3CHP/P3CLP) is not less than (i.e., not below) the second ratio (P3HP/P3LP), the method returns to operations 402 and 403, and continues determining the low power/low speed value (e.g., acquisition point) and the high power/high speed value (e.g., acquisition point), respectively.

When, however, the first ratio (P3CHP/P3CLP) is less than (i.e., below) the second ratio (P3HP/P3LP), a fault flag is raised at operation 414. The fault flag can indicate, for example, that a fault exists with either the BOV or the engine compressor. The fault can include a BOV modulation fault and/or an air leakage or blockage in the engine compressor. In one or more non-limiting embodiments, the method can further take appropriate annunciations, accommodations and/or maintenance actions based on the diagnosis determined in operation 414.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An aircraft engine comprising:
a compressor section including an engine compressor;
a bleed off valve (BOV) fluidically coupled to the compressor section; and
a controller configured to determine at least one real-time compressor delivery pressure in the compressor section and to determine whether at least one fault is present in the aircraft engine based on a comparison between the at least one real-time compressor delivery pressure and at least one predetermined nominal compressor delivery pressure resulting from a non-faulty BOV valve and a non-faulty compressor,
wherein the at least one fault includes one or both of a first fault present in the BOV and a second fault present in the compressor section, the at least one real-time compressor delivery pressure includes a first real-time compressor delivery pressure (P3CLP) and a second real-time compressor delivery pressure (P3CHP) that is greater than the first real-time compressor delivery pressure, and the at least one predetermined nominal compressor delivery pressure includes a first predetermined nominal compressor delivery pressure (P3LP) and a second predetermined nominal compressor delivery pressure (P3HP) that is greater than the first predetermined nominal compressor delivery pressure (P3LP), and
wherein the controller determines a presence of the first fault in the BOV in response to the second real-time compressor delivery pressure (P3CHP) being lower than the second predetermined nominal compressor delivery pressure (P3HP) and the first real-time compressor delivery pressure (P3CLP) being equal or greater than the first predetermined nominal compressor delivery pressure (P3LP).

2. The aircraft engine of claim 1, wherein:
the first real-time compressor delivery pressure (P3CLP) is determined when the engine compressor is operating at one or both of a low power and low speed and the second real-time compressor delivery pressure (P3CHP) is determined when the engine compressor is operating at one or both of a high power greater than the low power and a high speed greater than the low speed; and
the first predetermined nominal compressor delivery pressure (P3LP) is determined when the engine compressor is operating at one or both of the low power and the low speed and the second predetermined nominal compressor delivery pressure (P3HP) is determined when the engine compressor is operating at one or both of the high power greater the high speed.

3. The aircraft engine of claim 2, wherein the controller determines a presence of the second fault in the compressor section in response to the first real-time compressor delivery pressure (P3CLP) being lower than the first predetermined nominal compressor delivery pressure (P3LP) and the second real-time compressor delivery pressure (P3CHP) being lower than the second predetermined nominal compressor delivery pressure (P3HP).

4. The aircraft engine of claim 3, wherein the controller determines the first fault and the second fault are not present in response to the first real-time compressor delivery pressure (P3CLP) being equal or greater than the first predetermined nominal compressor delivery pressure (P3LP) and the second real-time compressor delivery pressure being equal (P3CHP) or greater than the second predetermined nominal compressor delivery pressure (P3HP).

5. The aircraft engine of claim 3, wherein the controller determines a false fault detection in response to the first real-time compressor delivery pressure (P3CLP) being lower than the first predetermined nominal compressor delivery pressure (P3LP) and the second real-time compressor delivery pressure (P3CHP) being equal or greater than the second predetermined nominal compressor delivery pressure (P3HP).

6. The aircraft engine of claim 2, wherein the controller determines a presence of the at least one fault in response to comparing a first ratio, between the second real-time compressor delivery pressure (P3CHP) and the first real-time compressor delivery pressure (P3CLP), and a second ratio, between the second predetermined nominal compressor delivery pressure (P3HP) and the first predetermined nominal compressor delivery pressure (P3LP).

7. The aircraft engine of claim 6, wherein the controller determines the presence of the at least one fault in response to the first ratio being less than the second ratio.

8. A method of diagnosing an aircraft engine, the method comprising:
fluidically coupled a bleed off valve (BOV) to a compressor section which includes an engine compressor of the aircraft engine; and
determining, using a controller, at least one real-time compressor delivery pressure in the compressor section;
comparing, by the controller, the at least one real-time compressor delivery pressure and at least one predetermined nominal compressor delivery pressure resulting from a non-faulty BOV valve and a non-faulty compressor;
determining, using the controller, whether at least one fault is present in the aircraft engine based on the comparison, the at least one fault including one or both of a first fault present in the BOV and a second fault present in the compressor section;
determining one or both of a first fault present in the BOV and a second fault present in the compressor section;

determining a first real-time compressor delivery pressure (P3CLP) and a second real-time compressor delivery pressure (P3CHP) that is greater than the first real-time compressor delivery pressure;

determining a first predetermined nominal compressor delivery pressure (P3LP) and a second predetermined nominal compressor delivery pressure (P3HP) that is greater than the first predetermined nominal compressor delivery pressure (P3LP); and determining a presence of the second fault in the compressor section in response to the first real-time compressor delivery pressure (P3CLP) being lower than the first predetermined nominal compressor delivery pressure (P3LP) and the second real-time compressor delivery pressure (P3CHP) being lower than the second predetermined nominal compressor delivery pressure (P3HP).

9. The method of claim 8, further comprising:

determining the first real-time compressor delivery pressure (P3CLP) when the engine compressor is operating at one or both of a low power and low speed;

determining the second real-time compressor delivery pressure (P3CHP) when the engine compressor is operating at one or both of a high power greater than the low power and a high speed greater than the low speed;

determining the first predetermined nominal compressor delivery pressure (P3LP) when the engine compressor is operating at one or both of the low power;

determining the low speed and the second predetermined nominal compressor delivery pressure (P3HP) when the engine compressor is operating at one or both of the high power greater the high speed.

10. The method of claim 9, further comprising determining a presence of the second fault in the compressor section in response to the first real-time compressor delivery pressure (P3CLP) being lower than the first predetermined nominal compressor delivery pressure (P3LP) and the second real-time compressor delivery pressure (P3CHP) being lower than the second predetermined nominal compressor delivery pressure (P3HP).

11. The method of claim 10, further comprising determining the first fault and the second fault are not present in response to the first real-time compressor delivery pressure (P3CLP) being equal or greater than the first predetermined nominal compressor delivery pressure (P3LP) and the second real-time compressor delivery pressure being equal (P3CHP) or greater than the second predetermined nominal compressor delivery pressure (P3HP).

12. The method of claim 10, further comprising determining a false fault detection in response to the first real-time compressor delivery pressure (P3CLP) being lower than the first predetermined nominal compressor delivery pressure (P3LP) and the second real-time compressor delivery pressure (P3CHP) being equal or greater than the second predetermined nominal compressor delivery pressure (P3HP).

13. The method of claim 9, further comprising determining a presence of the at least one fault in response to comparing a first ratio, between the second real-time compressor delivery pressure (P3CHP) and the first real-time compressor delivery pressure (P3CLP), and a second ratio, between the second predetermined nominal compressor delivery pressure (P3HP) and the first predetermined nominal compressor delivery pressure (P3LP).

14. The method of claim 13, further comprising determining the presence of the at least one fault in response to the first ratio being less than the second ratio.

* * * * *